United States Patent
Hsu (10) Patent No.: US 11,288,182 B2
(45) Date of Patent: Mar. 29, 2022

(54) METHOD AND COMPUTER PROGRAM PRODUCT AND APPARATUS FOR MULTI-NAMESPACE DATA ACCESS

(71) Applicant: Silicon Motion, Inc., Zhubei (TW)

(72) Inventor: Che-Wei Hsu, Taichung (TW)

(73) Assignee: SILICON MOTION, INC., Zhubei (TW)

( * ) Notice: Subject to any disclaimer, the term of this patent is extended or adjusted under 35 U.S.C. 154(b) by 73 days.

(21) Appl. No.: 16/732,542

(22) Filed: Jan. 2, 2020

(65) Prior Publication Data

US 2020/0401508 A1  Dec. 24, 2020

Related U.S. Application Data

(60) Provisional application No. 62/864,569, filed on Jun. 21, 2019.

(30) Foreign Application Priority Data

Nov. 14, 2019  (CN) .......................... 201911114737.5

(51) Int. Cl.
*G06F 12/02* (2006.01)
*G06F 12/0882* (2016.01)
(Continued)

(52) U.S. Cl.
CPC ........ *G06F 12/0246* (2013.01); *G06F 7/5443* (2013.01); *G06F 11/1004* (2013.01);
(Continued)

(58) Field of Classification Search
CPC ............... G06F 1/00–3296; G06F 3/00; G06F 3/06–0689; G06F 5/00–16; G06F 8/00;
(Continued)

(56) References Cited

U.S. PATENT DOCUMENTS 9,378,135 B2 * 6/2016 Bennett .................... G06F 12/06
10,545,687 B1 * 1/2020 Bernat .................. G06F 3/0631
(Continued)

FOREIGN PATENT DOCUMENTS

CN  103034562 A  4/2013
TW  201818249 A  5/2018
(Continued)

OTHER PUBLICATIONS

Definition of Logical Unit Number (LUN); Technopedia; Jan. 13, 2012; retrieved from https://web.archive.org/web/20120113025245/http://www.techopedia.com/definition/321/logical-unit-number-lun on Dec. 4, 2015 (2 pages) (Year: 2015).*

(Continued)

*Primary Examiner* — Daniel C. Chappell
(74) *Attorney, Agent, or Firm* — Birch, Stewart, Kolasch & Birch, LLP (57) ABSTRACT

The invention introduces a method for multi-namespace data access, performed by a controller, at least including: obtaining a host write command from a host, which includes user data and metadata associated with one Logical Block Address (LBA) or more; and programming the user data and the metadata into a user-data part and a metadata part of a segment of a Logical Unit Number (LUN), respectively, wherein a length of the metadata part is the maximum metadata length of a plurality of LBA formats that the controller supports.

18 Claims, 8 Drawing Sheets

(51) Int. Cl.
　　　*G06F 13/16* (2006.01)
　　　*G06F 11/10* (2006.01)
　　　*G06F 7/544* (2006.01)
(52) U.S. Cl.
　　　CPC ...... *G06F 12/0882* (2013.01); *G06F 13/1673* (2013.01); *G06F 2212/7201* (2013.01); *G06F 2212/7207* (2013.01)
(58) Field of Classification Search
　　　CPC ..... G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
　　　See application file for complete search history.

(56) References Cited

U.S. PATENT DOCUMENTS

| | | | | |
|---|---|---|---|---|
| 2008/0307155 | A1* | 12/2008 | Sinclair | G06F 3/0679 711/103 |
| 2009/0313453 | A1* | 12/2009 | Stefanus | G06F 11/1441 711/210 |
| 2010/0070735 | A1* | 3/2010 | Chen | G06F 12/12 711/206 |
| 2013/0019051 | A1 | 1/2013 | Somanache et al. | |
| 2016/0070644 | A1* | 3/2016 | D'Sa | G06F 3/0611 711/5 |
| 2017/0024137 | A1 | 1/2017 | Kanno | |
| 2018/0121344 | A1 | 5/2018 | Seo et al. | |
| 2018/0189174 | A1 | 7/2018 | Chou | |
| 2018/0260145 | A1* | 9/2018 | Margetts | G06F 13/1668 |
| 2019/0332321 | A1 | 10/2019 | Chen | |
| 2020/0065242 | A1 | 2/2020 | Chou | |
| 2020/0159423 | A1* | 5/2020 | Bernat | G06F 3/0619 |

FOREIGN PATENT DOCUMENTS

| | | |
|---|---|---|
| TW | I622890 B | 5/2018 |
| TW | I659359 B | 5/2019 |

OTHER PUBLICATIONS

Y. Sugiyama, T. Yamada, C. Matsui and K. Takeuchi, "Reconfigurable SCM Capacity Identification Method for SCM/NAND Flash Hybrid Disaggregated Storage," 2017 IEEE International Memory Workshop (IMW), 2017, pp. 1-4, doi: 10.1109/IMW.2017.7939098. (Year: 2017).*

C. Matsui, A. Arakawa, C. Sun and K. Takeuchi, "Write Order-Based Garbage Collection Scheme for an LBA Scrambler Integrated SSD," in IEEE Transactions on Very Large Scale Integration (VLSI) Systems, vol. 25, No. 2, pp. 510-519, Feb. 2017, doi: 10.1109/TVLSI.2016.2594200. (Year: 2017).*

H. Salem Alatawi and S. Abdullah Sharaf, "Toward Efficient Cloud Services: An Energy-Aware Hybrid Load Balancing Approach," 2020 International Conference on Computing and Information Technology (ICCIT-1441), 2020, pp. 1-5, doi: 10.1109/ICCIT-144147971.2020.9213777. (Year: 2020).*

English translation of Taiwanese Search Report dated Aug. 10, 2020 for Application No. 108141368.

* cited by examiner

METHOD AND COMPUTER PROGRAM PRODUCT AND APPARATUS FOR MULTI-NAMESPACE DATA ACCESS

CROSS-REFERENCE TO RELATED APPLICATIONS

This application claims the benefit of priority to U.S. Provisional Application Ser. No. 62/864,569, filed on Jun. 21, 2019; and Patent Application No. 201911114737.5, filed in China on Nov. 14, 2019; the entirety of which is incorporated herein by reference for all purposes.

BACKGROUND

The disclosure generally relates to storage devices and, more particularly, to a method, a computer program product and an apparatus for multi-namespace data access.

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NOR to access any random address in the way described above. Instead, a central processing unit (CPU) has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

The flash specification of next-generation, such as Non-Volatile Memory Express (NVMe) 1.4, allows the CPU to create several namespaces and the namespaces may apply different Logical Block Address (LBA) format to store user data. In reflection of different LBA formats, the metadata storage formats are different, in which metadata is data about user data. Although user data in different LBA formats can be collected in fixed lengths, such as 4K bytes (4 KB), the metadata lengths in different LBA formats are different, resulting in the increased complexity for accessing user data and metadata in different LBA formats from a NAND flash by the device. Thus, it is desirable to have a method, a computer program product and an apparatus for multi-namespace data access, so as to address the aforementioned problems.

SUMMARY

In an aspect of the invention, an embodiment introduces a method for multi-namespace data access, performed by a controller, at least including: obtaining a host write command from a host, which includes user data and metadata associated with one Logical Block Address (LBA) or more; and programming the user data and the metadata into a user-data part and a metadata part of a segment of a Logical Unit Number (LUN), respectively.

In another aspect of the invention, an embodiment introduces a non-transitory computer program product for multi-namespace data access when executed by a controller, at least including program code to: obtain a host write command from a host, which comprises user data and metadata associated with one LBA or more; and program the user data and the metadata into a user-data part and a metadata part of a segment of a LUN, respectively.

In still another aspect of the invention, an embodiment introduces an apparatus for multi-namespace data access, at least including: a host interface coupled to a host; a flash interface, coupled to a LUN; and a processing unit, coupled to the host interface and the flash interface. The processing unit is arranged to operably obtain a host write command from the host, which comprises user data and metadata associated with one LBA or more through the host interface; and program the user data and the metadata into a user-data part and a metadata part of a segment of the LUN, respectively.

A length of the metadata part is the maximum metadata length of LBA formats that the controller or the apparatus supports.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
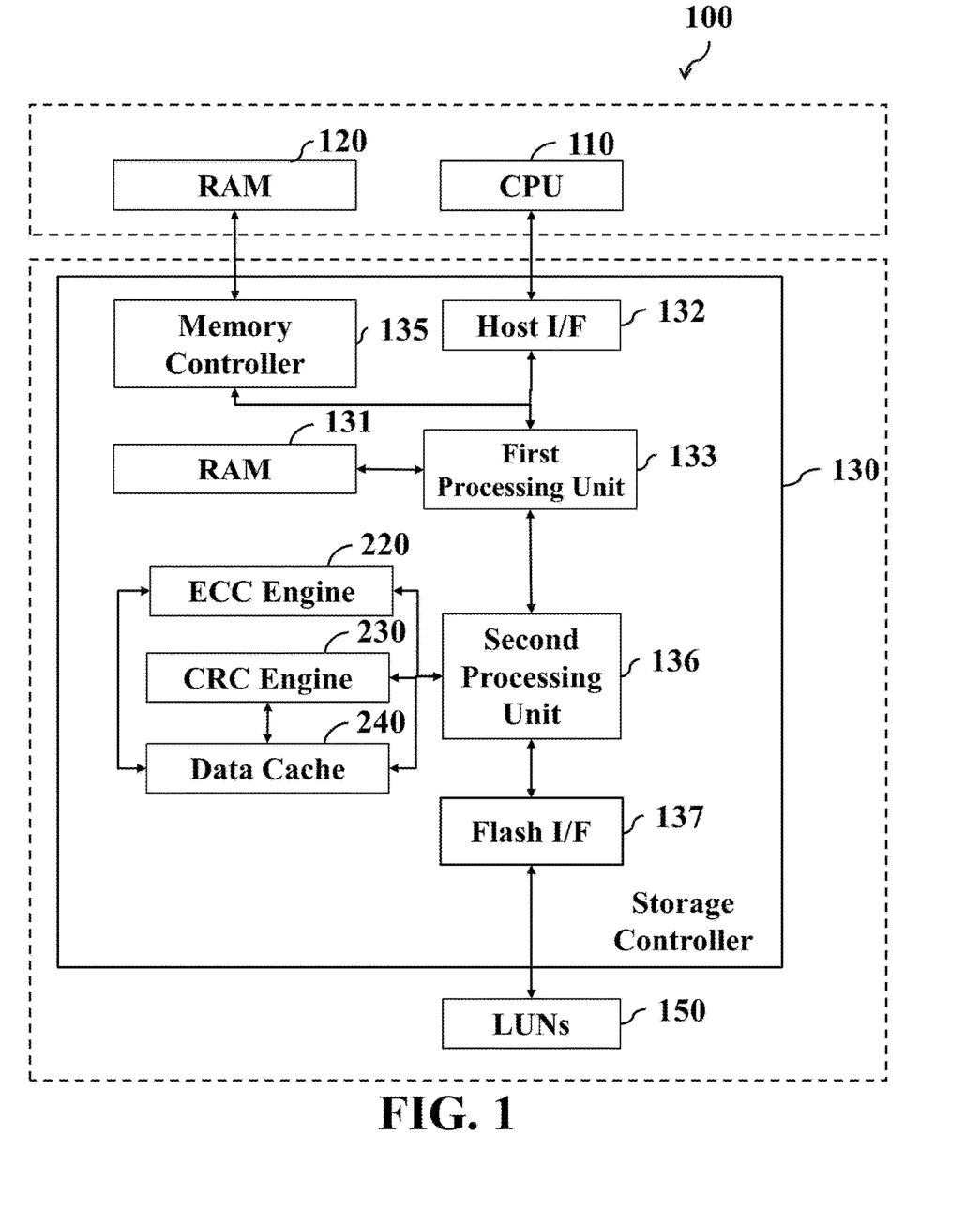
FIG. 1 is the flash system architecture according to an embodiment of the invention.

Refer to FIG. 1. The electronic apparatus 100 includes a host and a device, such as a Personal Computer (PC), a laptop PC, a notebook, a mobile phone, a digital camera, a digital recorder, or other consumer electronic products. The host may include a central processing unit (CPU) 110 and a Random Access Memory (RAM) 120. In the perspective of the device, the RAM 120 is an external RAM. The device may include a Solid State Disk (SSD) controller 130 and Logical Unit Numbers (LUNs) 150. The SSD controller 130 may include a first processing unit 133 and is optionally equipped with a RAM 131 for improving the performance of the SSD controller 130. The first processing unit 133 may receive commands from the CPU 110 through a host interface (I/F) 132 and instruct the flash I/F 137 to perform operations, such as data reads, data writes, block erases, etc. The CPU 110 and the first processing unit 133 may communicate with each other by a communications protocol, such as Non-Volatile Memory Express (NVMe), etc., through the host I/F 132. Any of the CPU 110 and the first processing unit 133 may be implemented in numerous ways, such as with general-purpose hardware (e.g., a single processor, multiple processors or graphics processing units capable of parallel computations, or others) that is programmed using firmware or software instructions to perform the functions recited herein. A RAM 131 may store necessary data in execution, such as variables, data tables, data abstracts, or others. In the perspective of the device, the RAM 131 is an internal RAM. The RAM 131 may be practiced in Static Random Access Memory (SRAM), Dynamic Random Access Memory (DRAM), or the combination thereof.

The LUNs 150 provide huge storage space typically in hundred Gigabytes, or even several Terabytes, for storing a wide range of user data, such as high-resolution images, video files, etc. The LUNs 150 include control circuits and memory arrays containing memory cells, such as Triple Level Cells (TLCs) or Quad-Level Cells (QLCs).

The SSD controller 130 includes the flash I/F 137 to communicate with the LUNs 150 via the flash I/F 137. The flash I/F 237 may be employ a Double Data Rate (DDR) protocol, such as Open NAND Flash Interface (ONFI), DDR toggle, or others.

The SSD controller 130 may include a second processing unit 136 to operate the LUNs 150 via the flash I/F 137, for example, outputting a page program command to write user data into a designated address (a destination address) of the LUNs 150 and outputting a page read command to read user data from a designated address (a source address) thereof. The flash I/F 137 may use several electronic signals including a data line, a clock signal line and control signal lines for coordinating command and data transfer with the LUNs 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

The second processing unit 136 may control operations of an Error Check and Correction (ECC) engine 220 and a Cyclic Redundancy Check (CRC) engine 230. The CRC engine 230 may generate CRC code for user data or metadata. The second processing unit 136 may use the CRC code to inspect whether the corresponding user data or metadata has error bits. The ECC engine 220 may generate ECC code for user data or metadata, such as Low-Density Parity Check Code (LDPC), Bose-Chaudhuri-Hocquenghem (BCH) code, etc. The second processing unit 136 may use the ECC code to correct error bits of corresponding user data or metadata.

Figure 3:
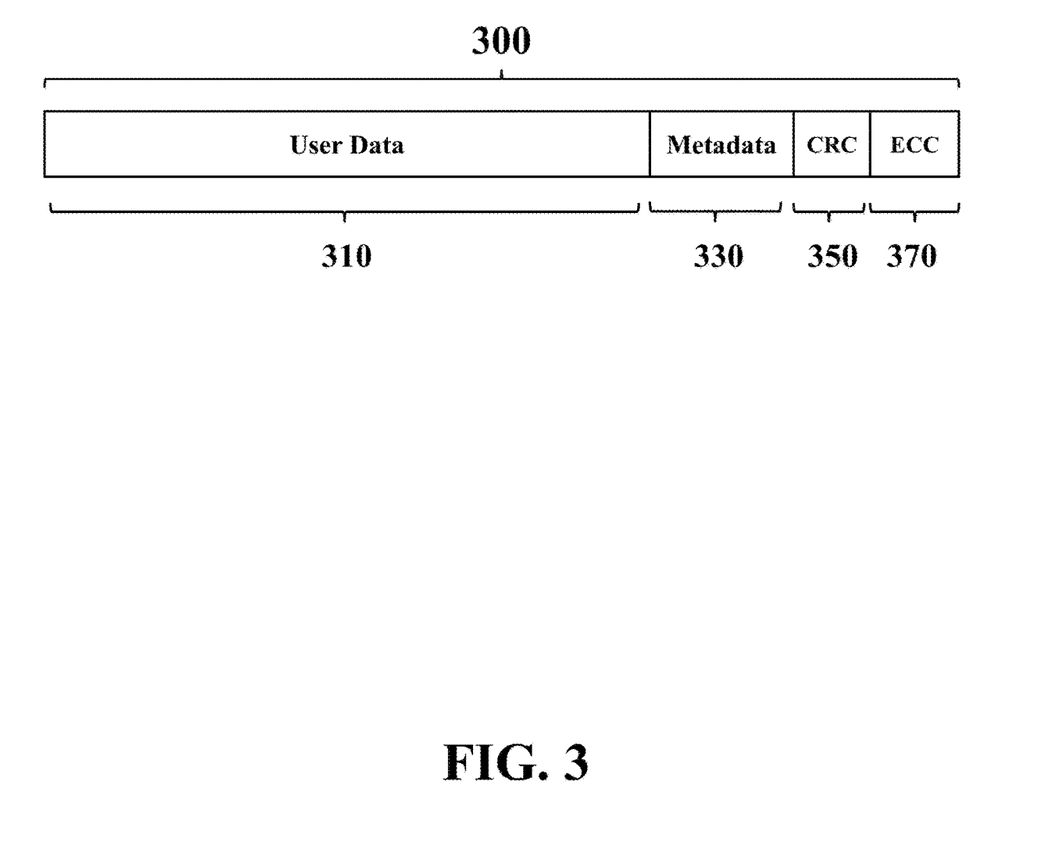
FIG. 3 is a schematic diagram illustrating the data organization of each segment of a LUN according to an embodiment of the invention.
Figure 4:
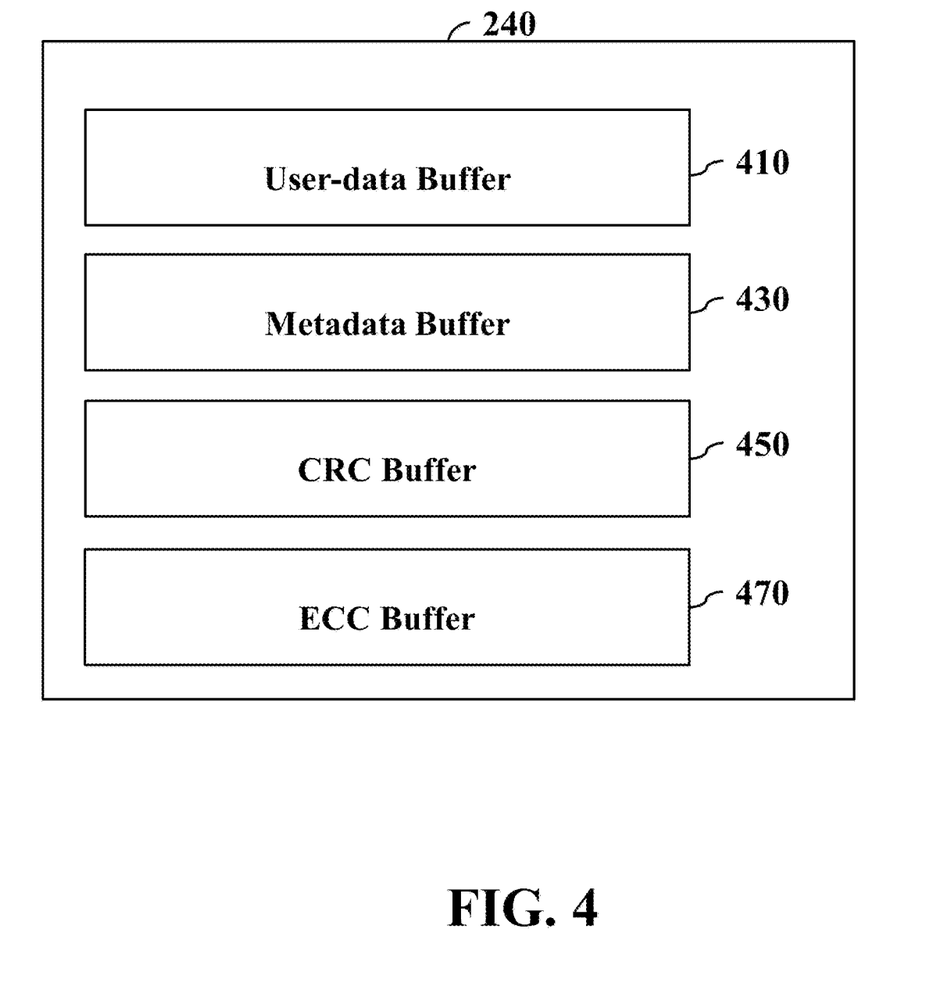
FIG. 4 is a schematic diagram illustrating buffer divisions of a Random Access Memory (RAM) according to an embodiment of the invention.

The second processing unit 136 may temporarily store user data, metadata, CRC code, ECC code, or any combinations thereof in a data cache 240. Refer to FIG. 4. The data cache 240 may allocate space for a user-data buffer 410 and a metadata buffer 430 to store user data and metadata in different LBA formats, which are obtained from a host and will be programmed into the LUNs 150, respectively. The data cache may additionally allocate space for a CRC buffer 450 and an ECC buffer 470. Moreover, to accelerate data reads from pages of the LUNs 150 and data programming into pages of the LUNs 150, the second processing unit 136 may temporarily store user data 310, metadata 330, CRC code 350, ECC code 370 or any combinations thereof in the data cache 240 according to the predefined format as shown in FIG. 3. Therefore, the second processing unit 136 can program data in the predefined format into a page of the LUNs 150 and interpret data obtained from a page of the LUNs 150 according to the predefined format.

Figure 2:
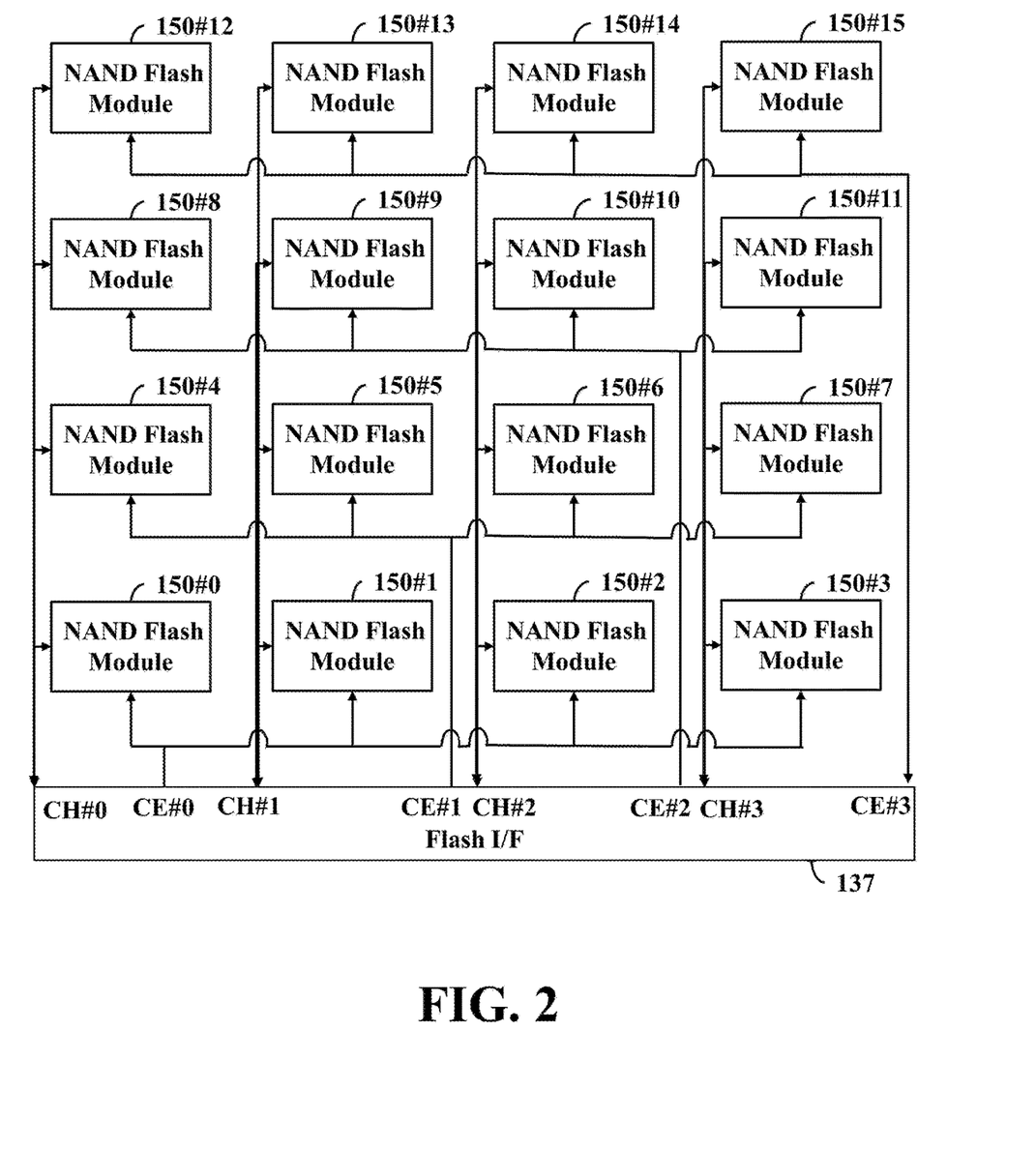
FIG. 2 is a schematic diagram illustrating Logical Unit Numbers (LUNs) connecting to a flash interface.

Refer to FIG. 2. The flash I/F 137 may include four I/O channels (hereinafter referred to as channels) CH #0 to CH #3 and each is connected to four LUNs, for example, the channel CH #0 is connected to the LUNs 150 #0, 150 #4, 150 #8 and 150 #12. Each LUN can be practiced in a NAND flash module and packaged in an independent die. The second processing unit 136 may drive the flash I/F 137 to issue one of the CE signals CE #0 to CE #3 to activate the LUNs 150 #0 to 150 #3, the LUNs 150 #4 to 150 #7, the LUNs 150 #8 to 150 #11, or the LUNs 150 #12 to 150 #15, and read data from or program data into the activated LUNs in parallel.

The host may instruct the SSD controller 130 to create more than one namespace, for example, two namespaces, each namespace has independent LBA range to store individual user data and the namespaces use different LBA formats to manage their user data. The LBA format defines lengths of user data and metadata that one LBA maps to. For example, an LBA format may define the length of user data is 512 B (Bytes) or 4 KB (Kilo Bytes) and the length of metadata is 0 B, 8 B, 16 B, 32 B, 64 B or 128 B. To support different LBA formats, in some implementations, the SSD controller 130 store user data and metadata in different LUNs, for example, LUN 150 #0 and LUN 150 #1, respectively. In such kind of implementations, the SSD controller has to create and maintain two different kinds of address mapping tables (Logical Address to Physical Address, L2P mapping tables): a user-data L2P mapping table for recording information indicating which physical address of the LUNs user data of each LBA is physically stored in; and a metadata mapping table for recording information indicating which physical address of the LUNs metadata of each LBA is physically stored in. However, the implementations require the SSD controller 130 to consume extra computation capacity to generate the meta-data L2P mapping tables and require the LUNs 150 to allocate extra space for storing the meta-data L2P mapping tables. The firmware complexity and the debug difficulty in the management, the data read and the data programming for user data and metadata are significantly increased.

To address the aforementioned technical problems, embodiments of the invention disclose a universal LBA format to support different LBA formats. The universal LBA format includes two parts: user-data; and metadata. The length of the user-data part is same as that of the aforementioned LBA formats, such as 4 KB, and the length of the metadata part is 128 B. Since the length of the metadata part is fixed to 128 B, regardless of which LBA format the host instructs the SSD controller 130 to use, the metadata can be stored in the metadata part of the universal LBA format, so as to achieve the objective of the invention.

In addition, to provide the capability for inspecting and correcting errors, the universal LBA format may additionally include two parts: a CRC; and an ECC. The CRC part may store a CRC code used to check whether the user data and the metadata of this section have error bits. The ECC part may store an ECC code used to correct error bits of the user data and the metadata of this section. Refer to FIG. 3. The length of the universal LBA format 300, for example, 4368B, includes the user-data part 310 of 4 KB of the space, the metadata part 330 of 128 B of the space, the CRC part 350 of 16 B of the space and the ECC part 370 of 128 B of the space. The user-data part 310 may store one 4 KB user-datagram or eight 512B user-datagrams. The metadata part 330 may store one meta-datagram associated with one 4 KB user-datagram or eight 512B user-datagrams. Alternatively, the metadata part 330 may store eight meta-datagrams individually associated with one 512B user-datagram.

Figure 5:
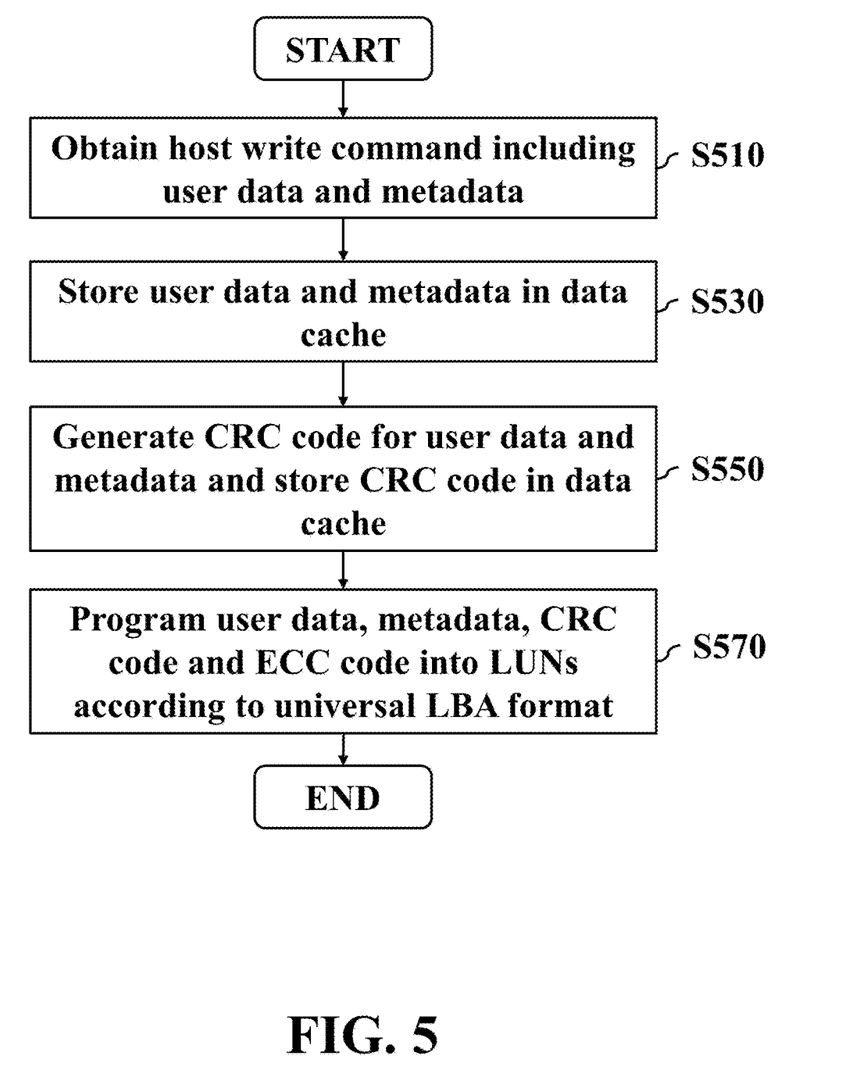
FIG. 5 is a flowchart illustrating a method for executing a host write command according to an embodiment of the invention.

FIG. 5 is a flowchart illustrating a method for executing host write commands, performed by the SSD controller 130 when loading and executing relevant software or firmware code, according to an embodiment of the invention.

Step S510: A host write command is obtained from a host, which includes user data and metadata. A particular region of the RAM 120 may be allocated as a SQ for storing the host write command. Another particular region of the RAM 120 may be allocated for storing the user data and the metadata. The SSD controller 130 may obtain the host write command from the SQ and obtain the user data and the metadata according to information of the host write command. A memory controller 135 of the SSD controller 130 may use a communications protocol, such as Double Data Rate 3 (DDR3), Double Data Rate 4 (DDR4), etc., to access to the RAM 120.

Figure 7:
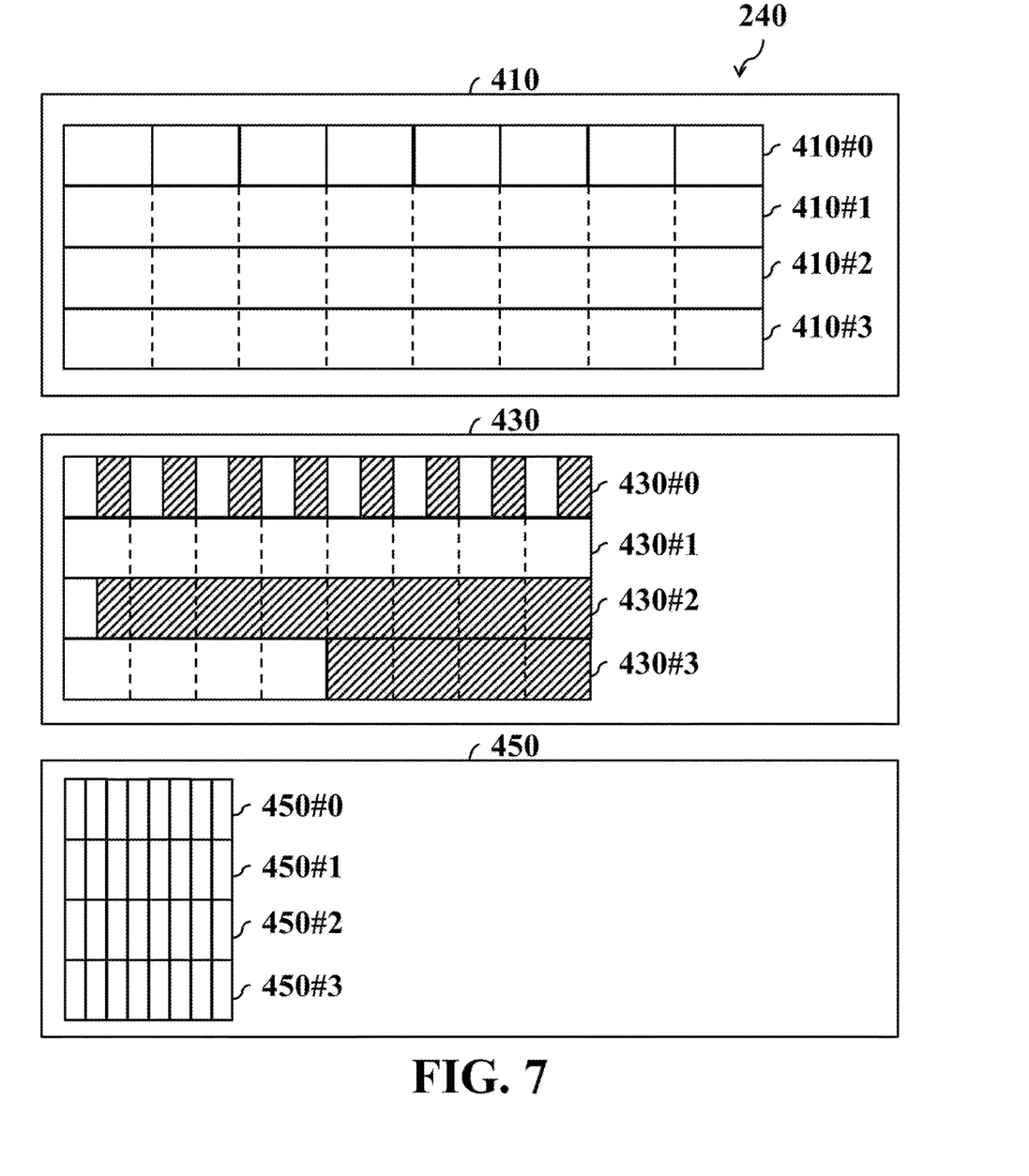
FIG. 7 is a schematic diagram illustrating the data organization of user data, metadata and Cyclic Redundancy Check (CRC) codes for different Logical Block Address (LBA) formats according to an embodiment of the invention.

Step S530: The user data and the metadata are stored in the data cache 240. Refer to FIG. 7. The SSD controller stores the user data and the metadata in the data cache 240. The user-data buffer 410 of the data cache 240 includes four 4 KB regions 410 #0 to 410 #3 and the metadata buffer 430 of the data cache 240 includes four 128 KB regions 430 #0 to 430 #3.

Suppose that an LBA number maps to a 512B user-datagram and an 8 B meta-datagram. To conform to the universal LBA format, the second processing unit 136 may conceptually divide the region 410 #0 into eight 512B sub-regions for storing user-datagrams of eight LBA numbers, respectively. For 8B of space is remained after each sub-region stores 8B of metadata, the first processing unit 133 may fill the remaining space of each sub-region (for example, the rectangles in slashes of the region 430 #0) with dummy values.

Suppose that an LBA number maps to a 4 KB user-datagram and a 128B meta-datagram. The second processing unit 136 may use the whole space of the region 410 #1 to store the user-datagram of this LBA and use the whole space of the region 430 #1 to store the meta-datagram of this LBA.

Suppose that an LBA number maps to a 4 KB user-datagram and an 8 B meta-datagram. The second processing unit 136 may use the whole space of the region 410 #2 to store the user-datagram of this LBA, use 8B of space of the region 430 #2 to store the meta-datagram of this LBA and fill the remaining space of the region 430 #2 (for example, the rectangles in slashes of the region 430 #2) with dummy values.

Suppose that an LBA number maps to a 4 KB user-datagram and a 64B meta-datagram. The second processing unit 136 may use the whole space of the region 410 #3 to store the user-datagram of this LBA, use 64B of space of the region 430 #3 to store the meta-datagram of this LBA and fill the remaining space of the region 430 #3 (for example, the rectangles in slashes of the region 430 #3) with dummy values.

Step S550: A CRC code is generated for the user data and the metadata and is stored in the data cache 240. The second processing unit 136 drives the CRC engine 230 to generate CRC codes according to user-datagrams and meta-datagrams of the data cache 240 and store the CRC codes in the CRC buffer 450 of the data cache 450. Refer to FIG. 7. The CRC buffer 450 includes four 16B regions 450 #0 to 450 #3.

Refer to FIG. 7. The second processing unit 136 may conceptually divide the region 450 #0 into eight 2B sub-regions for storing CRC codes according to the datagrams of the eight sub-regions of the region 410 #0 and eight sub-regions of the region 430 #0, respectively. For example, the first sub-region of the region 450 #0 stores a CRC code generated according to the datagrams of the first sub-region of the region 410 #0 and the first sub-region of the region 430 #0, and so on.

Step S570: The user data, the metadata, the CRC code and an ECC code are programmed into the LUNs 150 according to the universal LBA format, in which the ECC code is generated according to the user data and the metadata. The second processing unit 136 outputs the user data and the metadata to the ECC engine sequentially to generate the ECC code and programs the user data, the metadata, the CRC code and an ECC code into an empty page of an active block of the LUNs 150 according to the universal LBA format. Furthermore, suppose that the length of one user-datagram is 4 KB and the length of the empty page is 18 KB: The second processing unit 136 may program the user data, the metadata, the corresponding CRC code and ECC code into the empty page according to the universal LBA format and fill the remaining space of the empty page with dummy values. Or, the second processing unit 136 may collect four user-datagrams and meta-datagrams, generate the corresponding four CRC codes and ECC codes according to the four user-datagrams and meta-datagrams, respectively, and program the four user-datagrams, meta-datagrams, CRC codes and ECC codes into the empty page.

Figure 6:
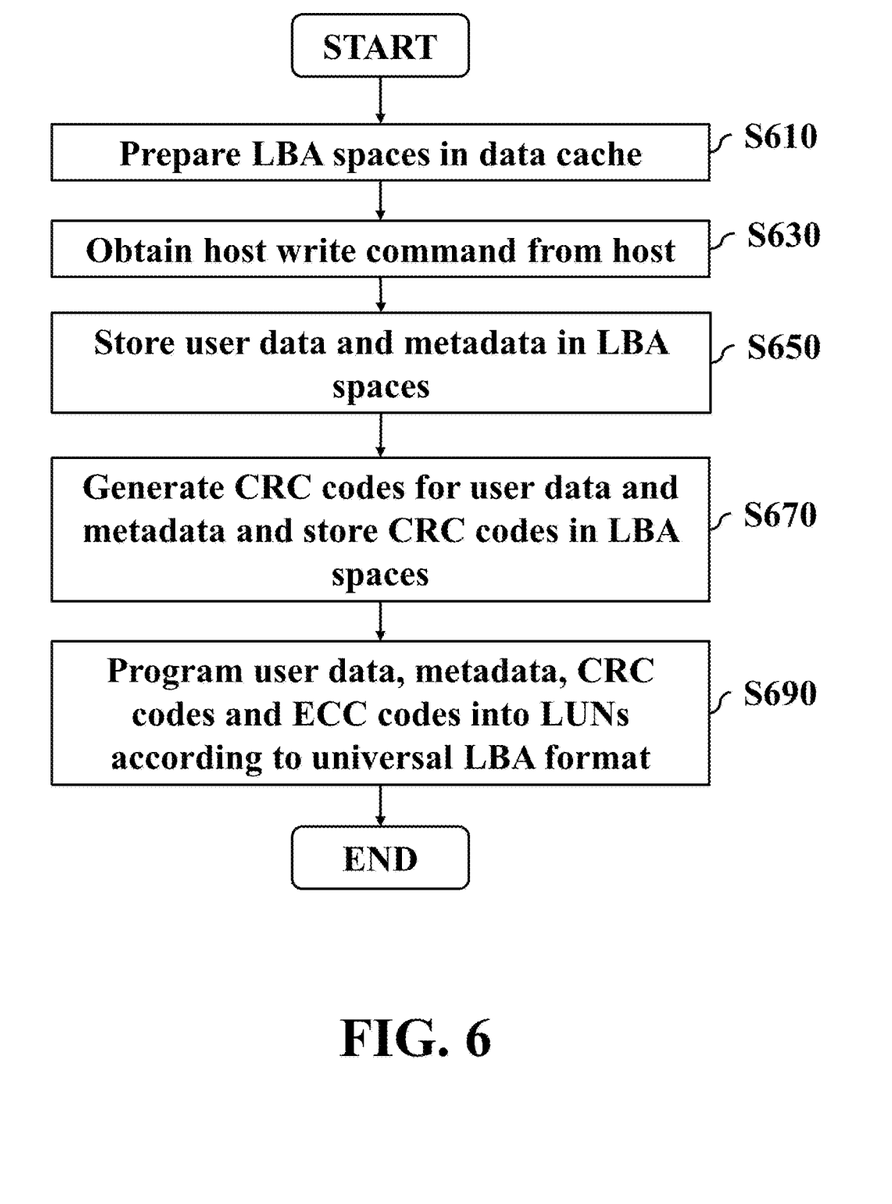
FIG. 6 is a flowchart illustrating a method for executing a host write command according to an embodiment of the invention.

FIG. 6 is a flowchart illustrating a method for executing host write commands, performed by the SSD controller 130 when loading and executing relevant software or firmware code, according to an embodiment of the invention.

Step S610: Multiple LBA spaces are prepared in the data cache 240 and each LBA space is used to buffer user data in 4 KB, metadata in 128 B and CRC code in 16 B.

Step S630: A host write command is obtained from a host, which includes user data and metadata.

Step S650: The user data and metadata are stored in the LBA spaces. The SSD controller 130 stores the user data and metadata of the host write command in the LBA spaces.

Step S670: CRC codes are generated for the user data and the metadata and are stored in the LBA spaces.

Step S690: The user data, the metadata, the CRC codes and the ECC codes are programmed into the LUNs 150 according to the universal LBA format, in which the ECC codes are generated according to the user data and the metadata.

Figure 8:
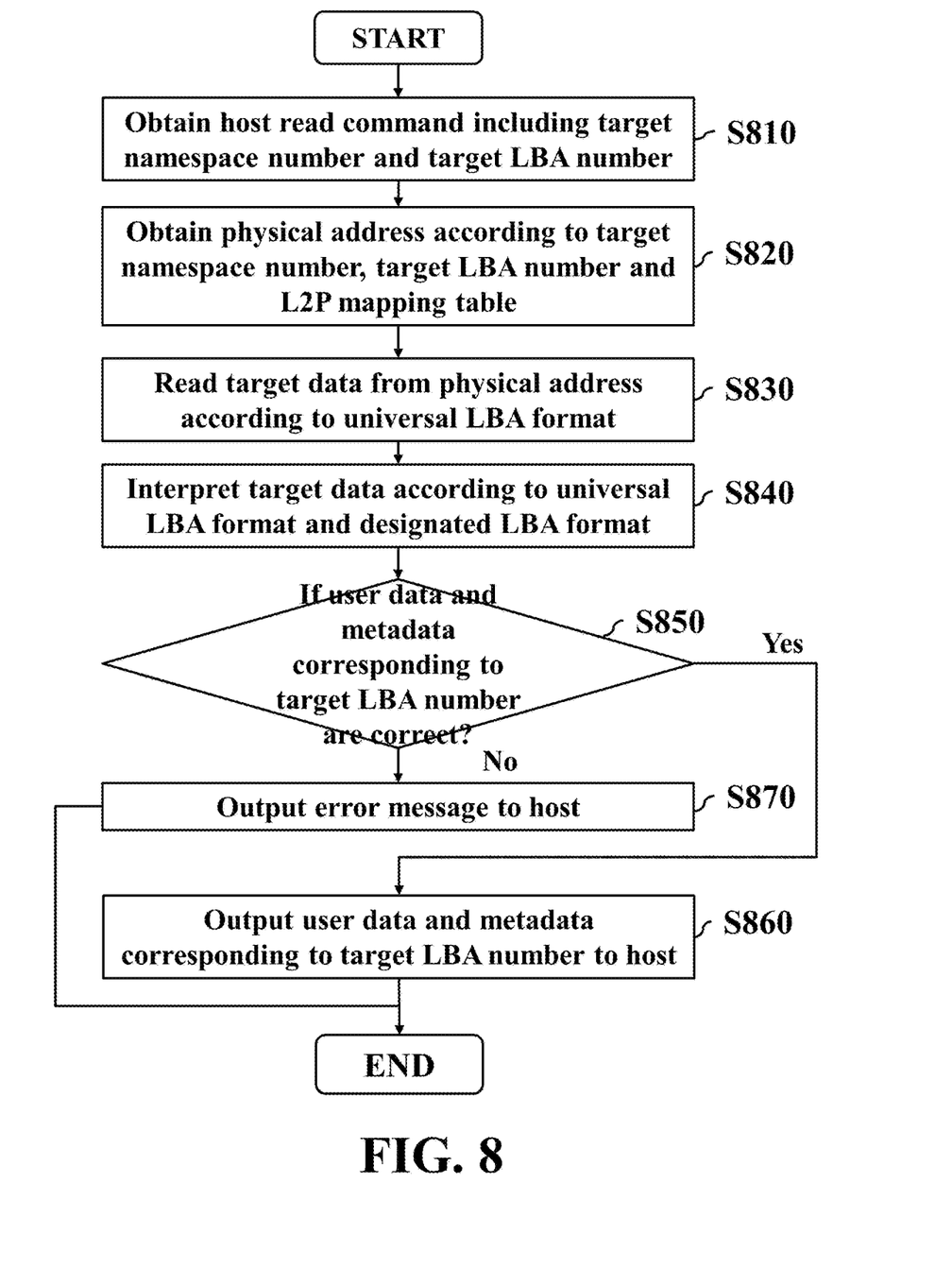
FIG. 8 is a flowchart illustrating a method for executing a host read command according to an embodiment of the invention.

Reflecting to the embodiment of the data organization as shown in FIG. 3, FIG. 8 is a flowchart illustrating a method for executing host read commands, performed by the SSD controller 130 when loading and executing relevant software or firmware code, according to an embodiment of the invention.

Step S810: A host read command is obtained from a host, which includes a target namespace number and a target LBA number. The host read command may include the target namespace number, the target LBA number, and an address of the RAM 120, that is, address information used by the SSD controller 130 to store the read-out user data and metadata. The namespace number, for example, is namespace #1 and the LBA number, for example, is LBA #100.

Step S820: A physical address is obtained according to the target namespace number, the target LBA number and the L2P mapping table. The physical address, for example, indicates the sector #1 of the page #20 of the block #10.

Step S830: Target data is read from the physical address according to the universal LBA format. The format of the target data is shown in FIG. 3.

Step S840: The user data, the metadata and the CRC codes corresponding to the target LBA number are obtained by interpreting the target data according to the universal LBA format and the designated LBA format, in which the designated LBA format was given in the creation of the target namespace number. The SSD controller 130 may maintain an LBA-format mapping table in the RAM 131 or the data cache 240, which includes multiple records individually storing information about an LBA format (that is, a designated LBA format) corresponding to each namespace. In some embodiments, each record may contain two fields: a namespace number; and a designated LBA-format number. In alternative embodiments, each record may contain three fields: a namespace number; a user-data length of a designated LBA format; and a metadata length of the designated LBA format. The second processing unit 136 may firstly feed the target data to an ECC decoder of the ECC engine 220 to correct error bit thereof. Since the target data has been corrected, the CRC engine 230 may output the user data, the metadata and the CRC codes corresponding to the LBA number. Meanwhile, the lengths of the user data and the CRC codes are recognized but the length of the metadata is not recognized. The second processing unit 136 may determine the valid length and the start position of the metadata to acquire valid metadata according to the designated LBA format, for example, the beginning 8B of the 128B metadata part is the valid metadata. In alternative embodiments, the second processing unit 136 may feed partial target data to the ECC decoder of the ECC engine 220 to perform the error correction. After the errors of the target data have been corrected, the CRC engine 230 may output the user data and the metadata corresponding to the target LBA number.

Step S850: It is determined whether the user data and the metadata corresponding to the target LBA number is correct according to the related CRC codes. The second processing unit 136 may feed the user data and the metadata corresponding to the target LBA number to a CRC decoder of the CRC engine 230 and determine whether a result generated by the CRC decoder matches the related CRC codes. If so, the process proceeds to step. S860. Otherwise, the process proceeds to step S870.

Step S860: The user data and the metadata corresponding to the target LBA number are output to the host. The SSD controller 130 may store the user data and the metadata in the address of the RAM 120 that is specified in the host read command.

Step S870: An error message is output to the host. Since error bits of the user data and the metadata corresponding to the LBA number is greater than the correction capability of the ECC engine 220, the ECC engine 220 cannot output the correct user data and metadata corresponding to the target LBA number. Therefore, the SSD controller 130 output the error message to the host.

Refer to the use cases of the first LBA format as shown in FIG. 7. The first processing unit 133 may read the user-datagram(s) from the sub-regions of the corresponding region 410 #0 of a page buffer, which are associated with one LBA number or more, and read the meta-datagram(s) from the beginning 8B of the sub-regions of the corresponding region 430 #0 of the page buffer, which are associated with one LBA number or more.

Refer to the use cases of the second LBA format as shown in FIG. 7. The first processing unit 133 may read the user-datagram from the corresponding region 410 #1 of a page buffer and the meta-datagram from the corresponding region 430 #1 of the page buffer.

Refer to the use cases of the third LBA format as shown in FIG. 7. The first processing unit 133 may read the user-datagram from the corresponding region 410 #2 of a page buffer and the meta-datagram from the beginning 8B of the corresponding region 430 #2 of the page buffer.

Refer to the use cases of the fourth LBA format as shown in FIG. 7. The first processing unit 133 may read the user-datagram from the corresponding region 410 #3 of a page buffer and the meta-datagram from the beginning 64B of the corresponding region 430 #3 of the page buffer.

It can compatible with all LBA formats that the SSD controller 130 supports to set the length of the user-data parts for all segments of the LUNs 150 to the maximum user-data length of all the LBA formats and set the length of the metadata parts for all segments of the LUNs 150 to the maximum metadata length of all the LBA formats. Moreover, it has no need to configure variable lengths of user-data parts and metadata parts to reflect to different LBA formats, resulting in the complexity reduction in read and write operations and the time savings for performing the read and write operations.

Some or all of the aforementioned embodiments of the method of the invention may be implemented in a computer program such as a driver for a dedicated hardware of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

Although the embodiment has been described as having specific elements in FIGS. 1 and 2, it should be noted that additional elements may be included to achieve better performance without departing from the spirit of the invention. Each element of FIGS. 1 and 2 is composed of various circuits and arranged to operably perform the aforementioned operations. While the process flows described in FIGS. 5, 6 and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for multi-namespace data access, performed by a controller, comprising:
    obtaining a host write command from a host for instructing the controller to write user data and metadata associated with one Logical Block Address (LBA) or more, wherein the metadata is data about the user data, the LBA or LBAs is located in a namespace, and the namespace uses an LBA format to manage the user data and the metadata;
    programming the user data into a user-data part of a segment of a Logical Unit Number (LUN); and
    programming the metadata into a metadata part of the segment of the LUN, wherein a length of the metadata part conforms to a universal LBA format regardless of the LBA format, and the universal LBA format supports different LBA formats that the controller supports; wherein the segment of the LUN comprises a Cyclic Redundancy Check (CRC) part, the method comprising: generating a CRC code according to the user data and the metadata associated with the LBA or LBAs; and programming the CRC code into the CRC part of the segment of the LUN; arranging and storing the user data and the metadata in a user-data region and a metadata region of a page buffer, respectively; and programming data of the user-data region and the metadata region of the page buffer into the user-data part and the metadata part of the segment of the LUN, respectively.

2. The method of claim 1, wherein a length of the user-data part conforms to the universal LBA format regardless of the LBA format.

3. The method of claim 2, wherein the length of the user-data part is 4 KB (Kilo Bytes) and the length of the metadata part is 128 B (Bytes).

4. The method of claim 1, wherein physical space of the LUN comprises a plurality of segments, each segment comprises the user-data part and the metadata part, lengths of all user-data parts are the same and lengths of all metadata parts are the same.

5. The method of claim 1, wherein the metadata part stores the metadata and a dummy value.

6. The method of claim 1, comprising:
    obtaining a host read command from the host, which instructs the controller to read the user data and the metadata associated with the LBA or LBAs;
    reading data of the user-data part and the metadata part of the segment of the LUN according to the universal LBA format; and
    outputting the user data of the user-data part and the metadata of the metadata part associated with the LBA or LBAs to the host according to an LBA format.

7. The method of claim 6, comprising:
    storing the data of the user-data part and the metadata part in a user-data region and a metadata region of a page buffer, respectively; and
    outputting the user data of the user-data region and the metadata of the metadata region associated with the LBA or LBAs to the host according to the LBA format.

8. The method of claim 6, wherein the metadata part stores the metadata and a dummy value.

9. A non-transitory computer program product for multi-namespace data access when executed by a controller, the non-transitory computer program product comprising program code to:
    obtain a host write command from a host for instructing the controller to write user data and metadata associated with one Logical Block Address (LBA) or more, wherein the metadata is data about the user data, the LBA or LBAs is located in a namespace, and the namespace uses an LBA format to manage the user data and the metadata;
    program the user data into a user-data part of a segment of a Logical Unit Number (LUN); and
    program the metadata into a metadata part of the segment of the LUN, wherein a length of the metadata part conforms to a universal LBA format regardless of the LBA format, and the universal LBA format supports different LBA formats that the controller supports; wherein the segment of the LUN comprises a Cyclic Redundancy Check (CRC) part, the method comprising: generating a CRC code according to the user data and the metadata associated with the LBA or LBAs; and programming the CRC code into the CRC part of the segment of the LUN; arranging and storing the user data and the metadata in a user-data region and a metadata region of a page buffer, respectively; and programming data of the user-data region and the metadata region of the page buffer into the user-data part and the metadata part of the segment of the LUN, respectively.

10. The non-transitory computer program product of claim 9, wherein a length of the user-data part conforms to the universal LBA format regardless of the LBA format.

11. The non-transitory computer program product of claim 9, wherein physical space of the LUN comprises a plurality of segments, each segment comprises the user-data part and the metadata part, lengths of all user-data parts are the same and lengths of all metadata parts are the same.

12. The non-transitory computer program product of claim 9, wherein the metadata part stores the metadata and a dummy value.

13. The non-transitory computer program product of claim 9, comprising program code to:
    obtain a host read command from the host, which instructs the controller to read the user data and the metadata associated with the LBA or LBAs;

read data of the user-data part and the metadata part of the segment of the LUN according to the universal LBA format; and output the user data of the user-data part and the metadata of the metadata part associated with the LBA or LBAs to the host according to an LBA format.

14. An apparatus for multi-namespace data access, comprising:

a host interface, coupled to a host;

a flash interface, coupled to a Logical Unit Number (LUN); and a processing unit, coupled to the host interface and the flash interface, arranged to operably obtain a host write command from the host for instructing the controller to write user data and metadata associated with one Logical Block Address (LBA) or more through the host interface, wherein the metadata is data about the user data, the LBA or LBAs is located in a namespace, and the namespace uses an LBA format to manage the user data and the metadata; program the user data into a user-data part of a segment of the LUN; and program the metadata into a metadata part of the segment of the LUN, wherein a length of the metadata part conform to a universal LBA format regardless of the LBA format, and the universal LBA format supports different LBA formats that the apparatus supports; wherein the segment of the LUN comprises a Cyclic Redundancy Check (CRC) part, the method comprising: generating a CRC code according to the user data and the metadata associated with the LBA or LBAs; and programming the CRC code into the CRC part of the segment of the LUN; arranging and storing the user data and the metadata in a user-data region and a metadata region of a page buffer, respectively; and programming data of the user-data region and the metadata region of the page buffer into the user-data part and the metadata part of the segment of the LUN, respectively.

15. The apparatus of claim 14, wherein a length of the user-data part conforms to the universal LBA format regardless of the LBA format.

16. The apparatus of claim 14, wherein physical space of the LUN comprises a plurality of segments, each segment comprises the user-data part and the metadata part, lengths of all user-data parts are the same and lengths of all metadata parts are the same.

17. The apparatus of claim 14, wherein the metadata part stores the metadata and a dummy value.

18. The apparatus of claim 14, wherein the processing unit is arranged to operably obtain a host read command from the host through the host interface, which instructs the controller to read the user data and the metadata associated with the LBA or LBAs; read data of the user-data part and the metadata part of the segment of the LUN through the flash interface according to the universal LBA format; and output the user data of the user-data part and the metadata of the metadata part associated with the LBA or LBAs to the host through the host interface according to an LBA format.

* * * * *